United States Patent [19]
Hill et al.

[11] Patent Number: 5,791,131
[45] Date of Patent: Aug. 11, 1998

[54] CONVERTIBLE MOWER BLADE

[75] Inventors: Amos G. Hill, McDonough, Ga.; John P. Nelson, Naples, Fla.; Richard J. Wilkey, Hartland, Wis.

[73] Assignee: Snapper, Inc., McDonough, Ga.

[21] Appl. No.: 702,226

[22] Filed: Aug. 23, 1996

Related U.S. Application Data

[63] Continuation-in-part of Ser. No. 635,515, Apr. 22, 1996, abandoned.

[51] Int. Cl.$^6$ ................................................. A01D 55/00
[52] U.S. Cl. ........................... 56/295; 56/229; 56/DIG. 9
[58] Field of Search ................................. 56/12.7, 17.5, 56/255, 295, DIG. 17, DIG. 20, DIG. 9

[56] References Cited

U.S. PATENT DOCUMENTS

| | | |
|---|---|---|
| 4,313,297 | 2/1982 | Maier ........................... 56/295 |
| 4,715,173 | 12/1987 | Anderson ..................... 56/295 |
| 4,750,320 | 6/1988 | Liebl ............................ 56/295 |
| 4,815,264 | 3/1989 | Miynders ..................... 56/295 |

*Primary Examiner*—Michael J. Carone
*Assistant Examiner*—Robert Pezzuto
*Attorney, Agent, or Firm*—Jones & Askew

[57] ABSTRACT

One or more replaceable cutting blade tips and a central mounting bar comprise a blade assembly. Each of the replaceable cutting blade tips can be selectively attached to the central mounting bar without the use of tools. During typical operation, the replaceable cutting blade tips snugly fit relative to the central mounting bar and little, if any, relative pivoting therebetween is evident. However, some relative pivoting can occur when exceptional loads are encountered by the replaceable cutting blade tips such as when an obstacle such as a rock is encountered. In such an instance, a tearable "zipper" is provided which allows the blade tip to "tear" its way through the zipper while pivoting, thus advantageously providing a means for dissipating energy. Also provided is a "family of bars" concept which reduces inventory, reduces tooling expenses, and facilitates efficient and correspondingly low cost blade tips due to the volumes possible.

37 Claims, 12 Drawing Sheets

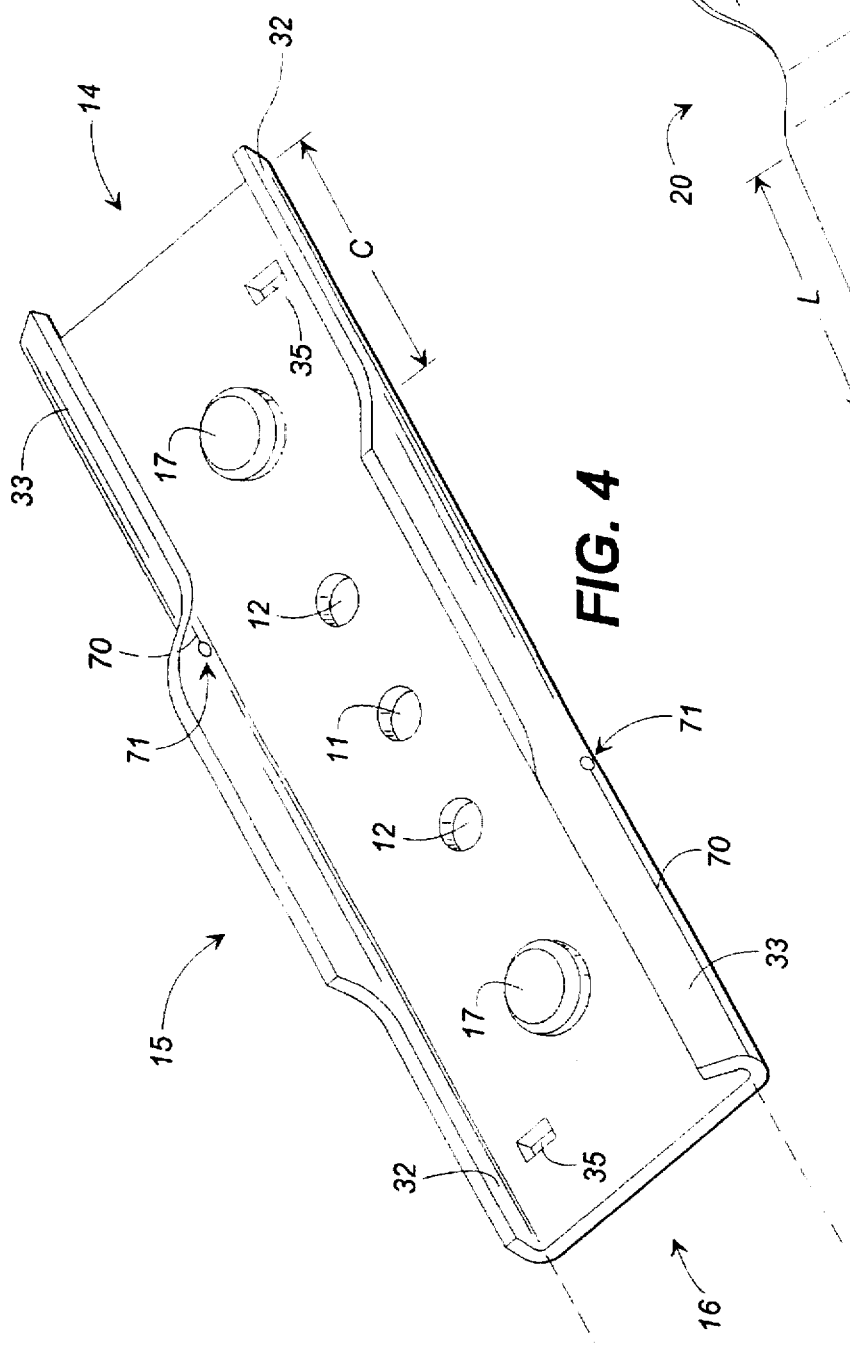
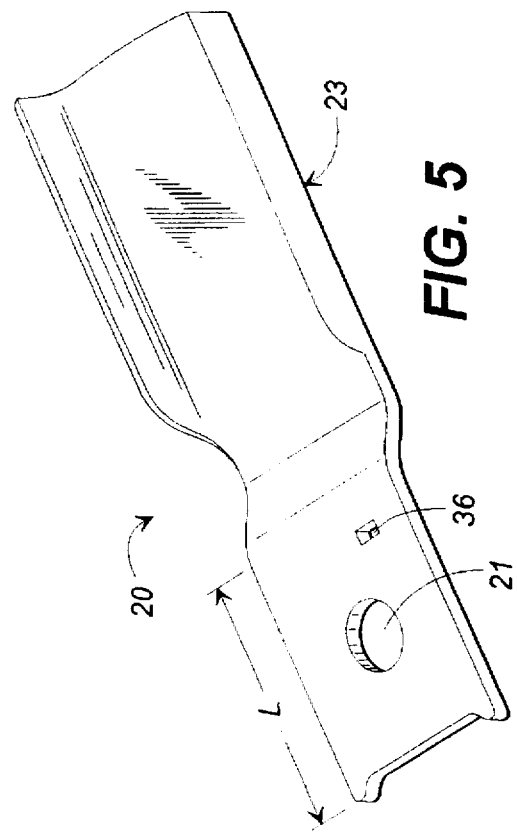
FIG. 4
FIG. 5

CONVERTIBLE MOWER BLADE

CROSS-REFERENCE TO RELATED APPLICATION

This is a continuation-in-part application of U.S. patent application Ser. No. 08/635,515, filed Apr. 22, 1996, entitled "Convertible Mower Blade", now abandoned.

TECHNICAL FIELD

This invention relates in general to lawn mowers and lawn mower blades, and particularly relates to replaceable lawn mower blades, each of which includes a central hub member or "mounting bar", and at least one and typically two replaceable cutting blade tip elements. The invention likewise relates to the use of a particular "family" of cutting bars which can be used in connection with a particular cutting blade tip configuration, as well as a deformable mounting bar feature which accommodates exceptional impact.

BACKGROUND OF THE INVENTION

In the field of grass or other vegetation cutting, it is well known to use an internal combustion engine or electric motor to drive a substantially vertical drive shaft having a cutting blade attached to the lower end thereof. Rotation of cutting edges on the blade (typically in a generally horizontal orientation) results in the severance of grass blades at a selected height.

As may be understood, the cutting edge(s) on the blades tend to become worn during use. In order to provide optimum cutting, it is known to sharpen the edges of such cutting blades. However, due to the labor involved in the removal of a blade tip and the sharpening of its edges, it is often found more economical for a lawn mower operator or owner to replace the blade tip with a new blade tip instead of sharpening the worn blade tip. This "replacement" concept has been developed into the use of a central "mounting bar" member (also sometimes known as a "hub"), which has one or more cutting elements removably attached thereto. When one of the cutting elements is dulled or damaged, the replaceable cutting elements can be removed from the central hub (leaving it still attached to the mower drive shaft), and a fresh, sharp, element is replaced therewith. Examples of such replaceable cutting elements are disclosed in U.S. Pat. Nos. 2,924,059 to Beeston, Jr., 2,932,147 to Beeston, Jr., 3,243,944 to Michaud, 3,327,460 to Blackstone, 3,388,540 to Michaud, 3,683,606 to Staines, 4,229,933 to Bernard, 4,375,148 to Beck, 4,445,315 to Roszkowski, 4,471,603 to Veltin, Jr., 4,594,843 to Andersson et al., 4,651,510 to Malutich, 4,715,173 to Anderson, 4,750,320 to Liebl, 4,779,407 to Pattee, 5,036,654 to Malutich, 5,271,212 to Anderson, and U.S. Pat. No. 5,019,113 to Burnell.

Although the prior art discloses the use of removable cutting elements on a central mounting bar or "hub", a need still exists for a replaceable blade tip configuration which is easy to replace and use by the operator, reliable, and cost-efficient to manufacture and operate.

SUMMARY OF THE INVENTION

The present invention overcomes deficiencies in the prior art by providing a replaceable cutting blade tip which is easy to replace and use by an operator, while also being reliable and cost-efficient to manufacture and operate.

Generally described, the present invention relates to the use of a replaceable grass cutting blade tip which can be used with a "family" of mounting bars having different lengths.

More particularly described, the present invention relates to the use of a blade tip having a through hole which accepts a headed pin member extending from within a channel defined by a mounting bar.

Therefore, it is an object of the present invention to provide an improved lawn mower.

It is a further object of the present invention to provide an improved lawn mower cutting blade.

It is a further object of the present invention to provide a cutting blade assembly having a central mounting bar and replaceable cutting elements or "blade tips".

It is a further object of the present invention to provide a detachable lawn mower blade tip which is reliable in operation in that its replaceable cutting blade tips do not tend to become separated from the mounting bar except when removed by the operator.

It is a further object of the present invention to provide a replaceable cutting blade tip which is simple to remove and install.

It is a further object of the present invention to provide a detachable lawn mower blade assembly which is simple in construction and quiet in operation.

It is a further object of the present invention to provide a detachable lawn mower cutting blade assembly which is simple to manufacture.

It is a further object of the present invention to provide a detachable lawn mower blade assembly which is economical to manufacture.

It is a further object of the present invention to provide a "family of bars" concept which reduces inventory, reduces tooling expenses, and facilitates efficient and corresponding low cost blade tips due to the volumes possible.

It is a further object of the present invention to provide a replaceable cutting blade tip which will not become detached upon impact with a stationary object.

It is a further object of the present invention to provide a detachable lawn mower blade tip which tends to interlock with a mounting bar upon impact between the moving blade tip and a stationary object.

It is a further object of the present invention to provide a cutting blade tip mounting bar including a "zipper" feature which allows for predicable tearing of the mounting bar upon contact of the blade tip with a stationary object.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 4 is an isolated pictorial view of a mounting bar according to one embodiment of the present invention.

3

FIG. 5 is an isolated pictorial view of a replaceable cutting blade tip according to one embodiment of the present invention.

Figure 6:
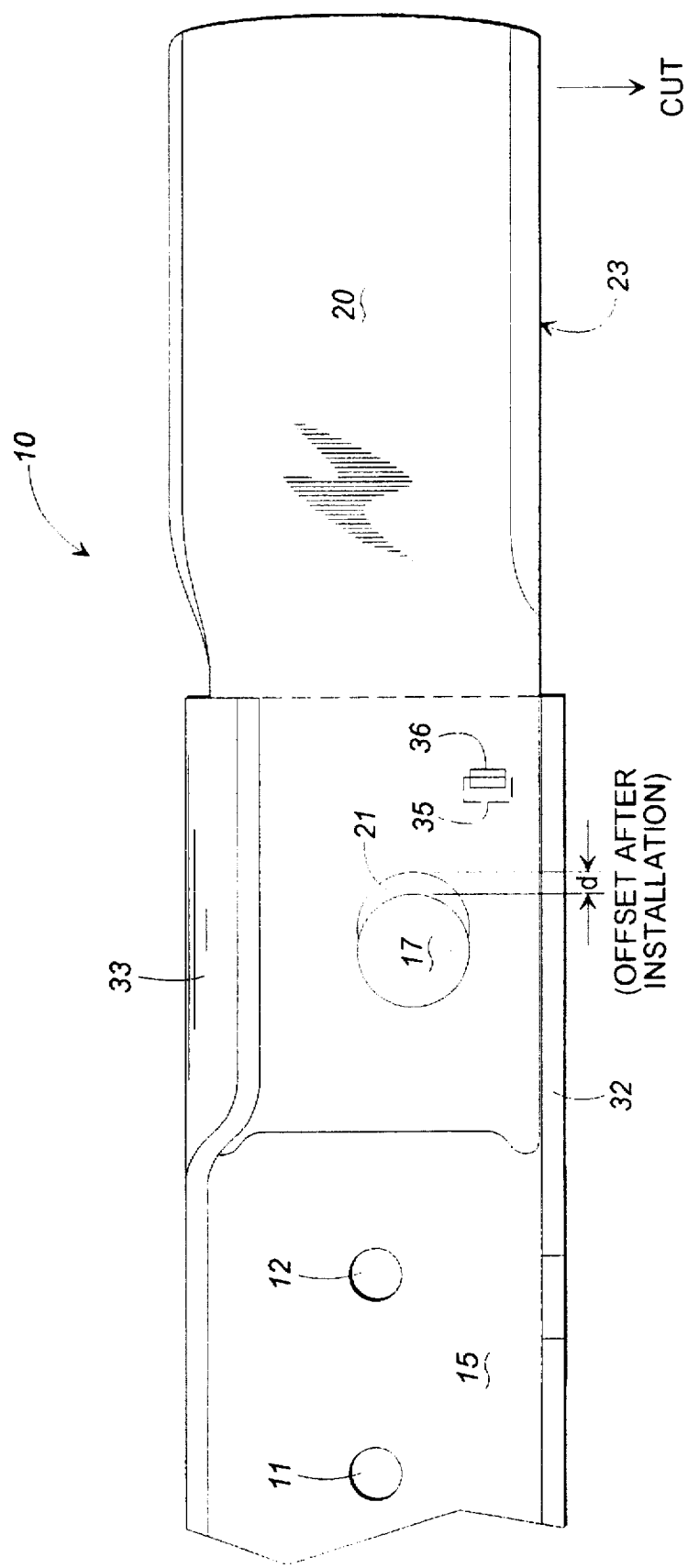

FIG. 6 is a top view of the cutting blade tip of FIG. 5, shown attached to one end of the mounting bar of FIG. 4, with only a portion of the mounting bar being shown.

Figure 7:
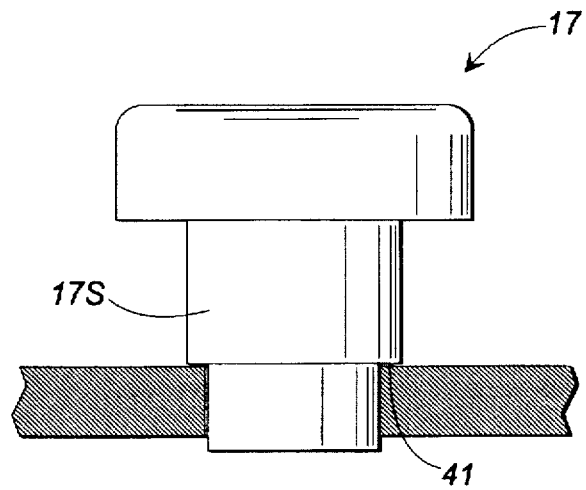

FIG. 7 is an isolated side view showing a headed pin member as installed within a mounting bar.

Figure 8:
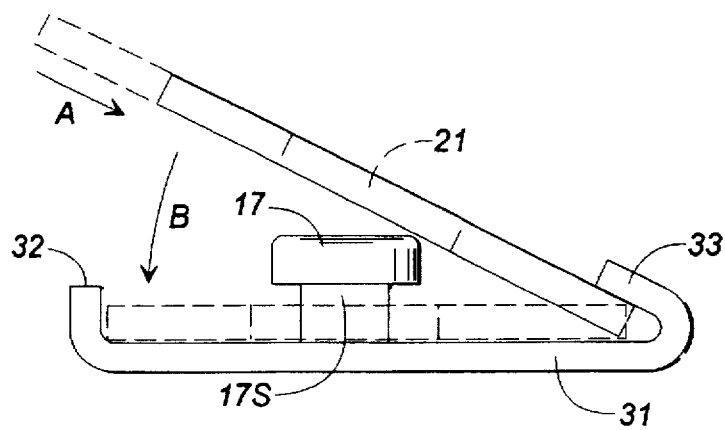

FIG. 8 is an end view of the elements shown in FIG. 6, illustrating the installation of the cutting blade tip relative to the mounting bar.

Figure 9:
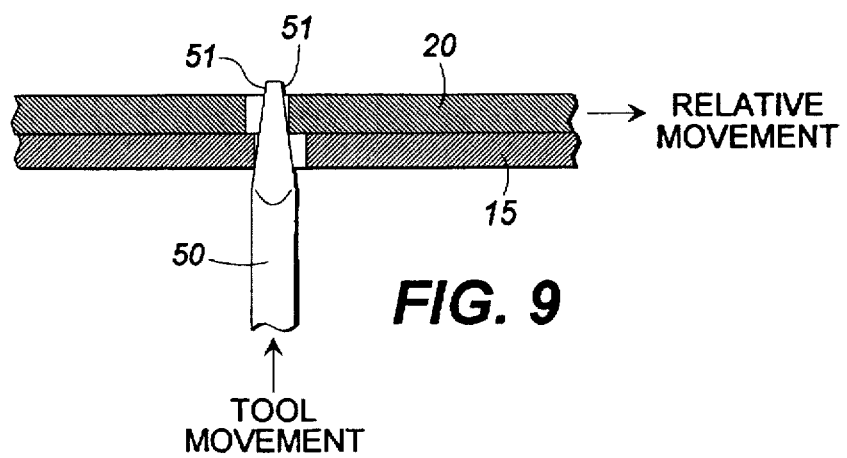

FIG. 9 is an isolated partial cross sectional view illustrating blade tip 20 removal by use of a removal tool, or "offdriver".

Figure 10:
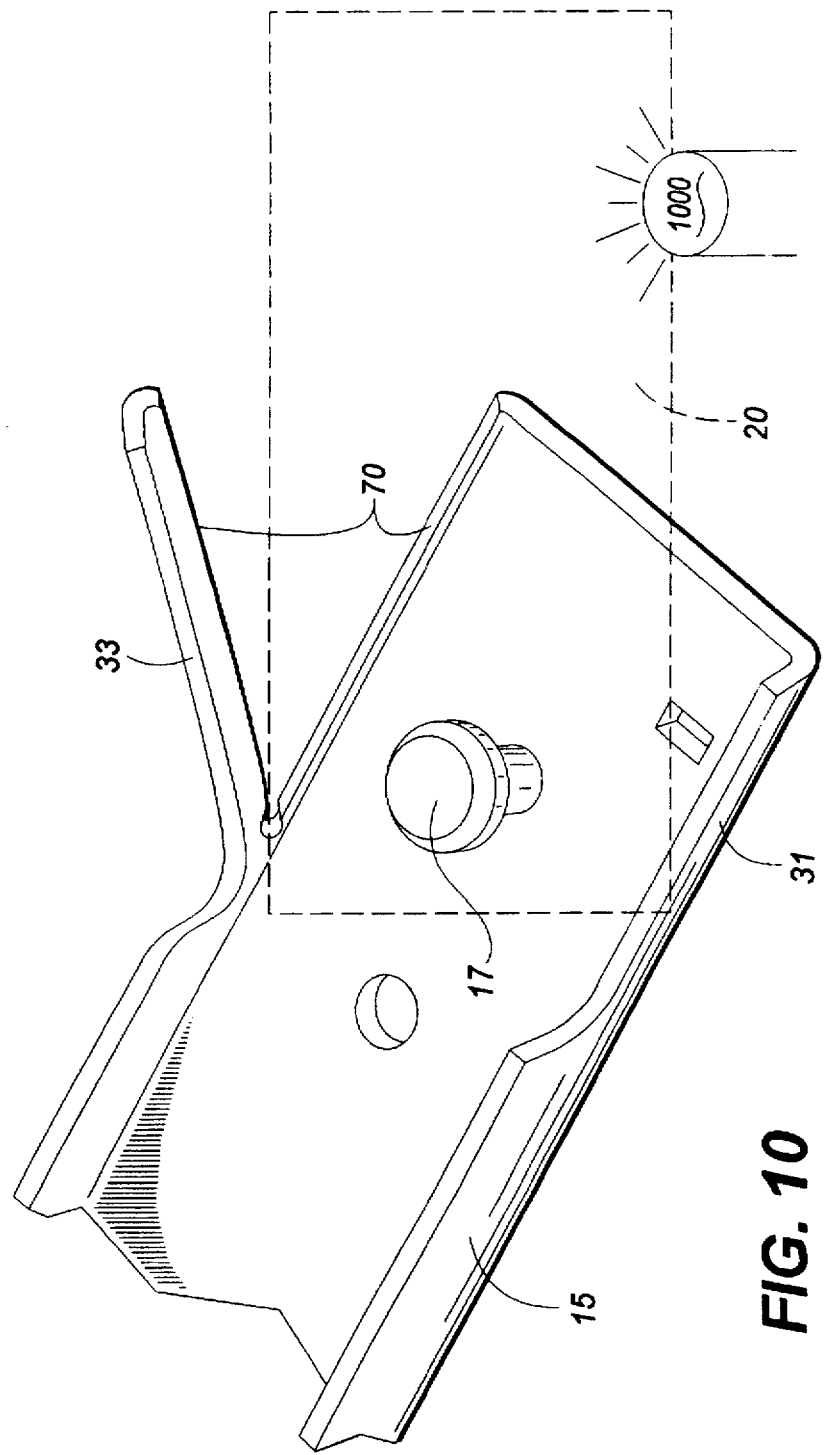

FIG. 10 is in illustrative view of the results possible when a blade tip (shown generally in dotted line) contacts an obstruction (such as a test stake) with a force sufficient to cause the mounting bar to deform.

Figure 11A:
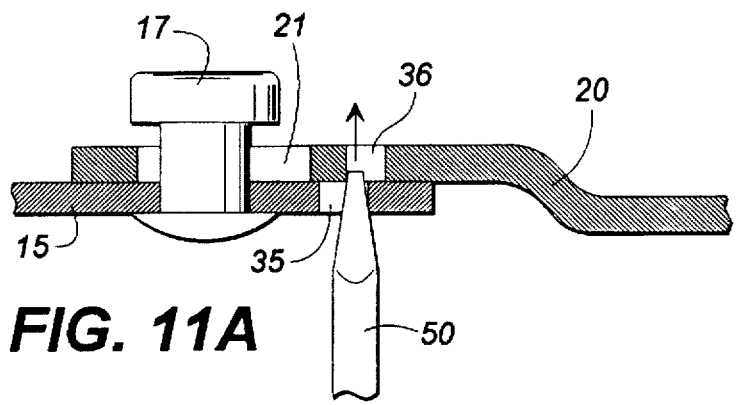
Figure 11B:
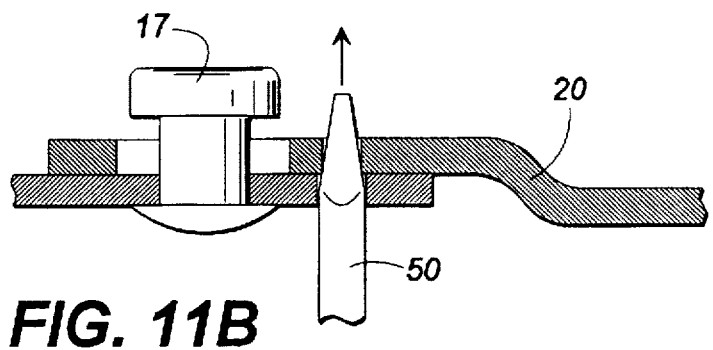
Figure 11C:
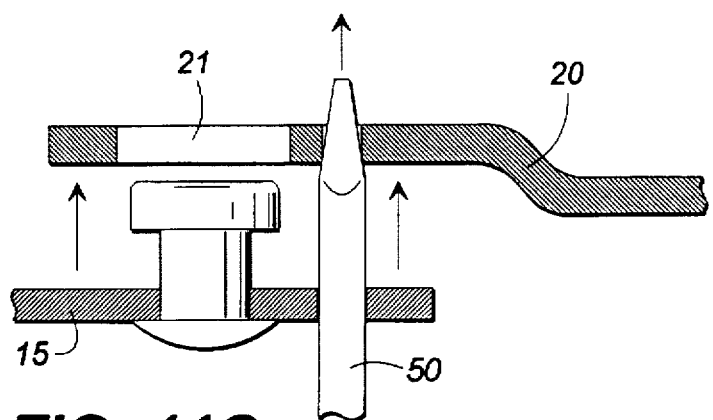
Figure 11D:
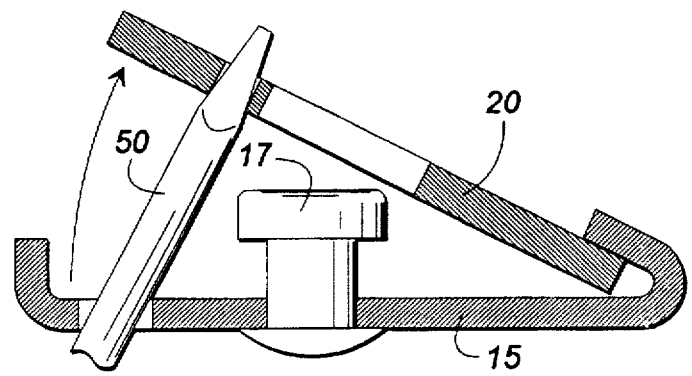

FIGS. 11A–11D illustrate three sequential steps (FIGS. 11C and 11D showing the same step) used to separate a typical cutting blade tip 20 from a typical mounting bar 15 by use of a typical removal tool 50. The headed pin member is shown in simplistic view; reference is made to FIG. 7 for a more detailed illustration.

Figure 12:
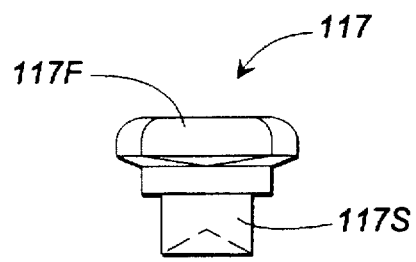

FIG. 12 is a top plan isolated view of an alternate headed pin member 117 having a "Double-D" head configuration.

Figure 13:
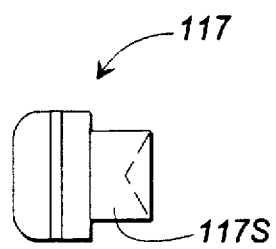

FIG. 13 is a side plan isolated view of the alternate headed pin member 117 of FIG. 12.

Figure 14:
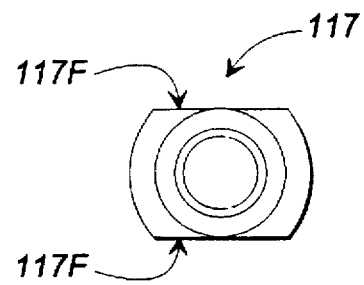

FIG. 14 is bottom plan isolated view of the alternate headed pin 117 of FIG. 12.

Figure 15:
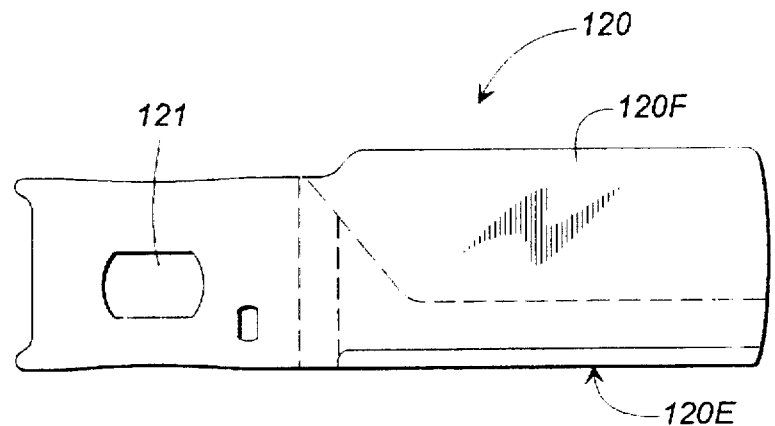

FIG. 15 is an isolated top plan view of a cutting blade tip 120 having an alternate, "Double D" hole 121 configuration, an upturned foil 120F and a cutting edge 120E.

Figure 16:
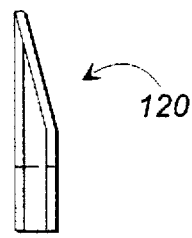

FIG. 16 is an outside end plan view of the cutting blade tip 120 shown in FIG. 15.

Figure 17:
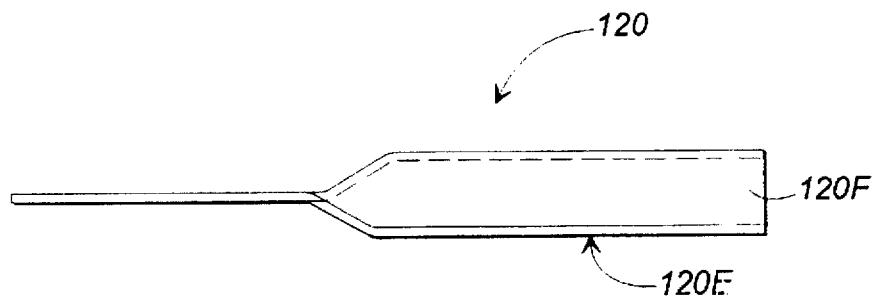

FIG. 17 is a leading edge plan view of the cutting blade tip 120 shown in FIG. 15.

Figure 18A:
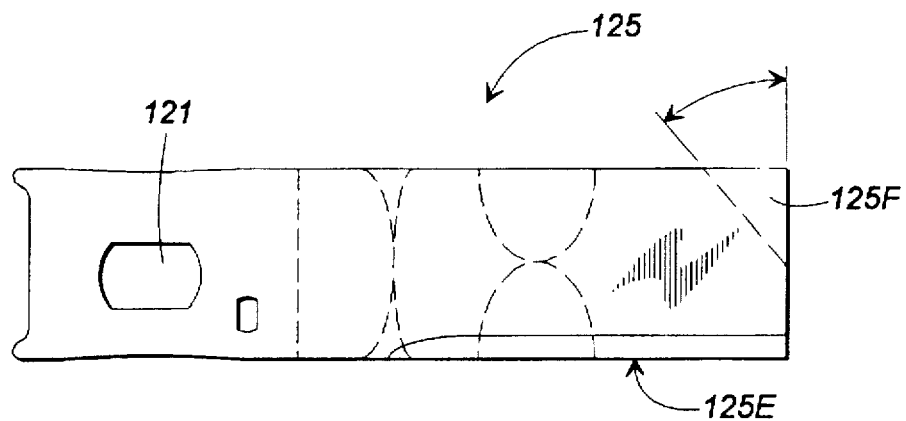

FIG. 18A is a top plan view of a cutting blade tip 125 having a cutting edge 125E and a downturned corner 125DC.

Figure 18B:
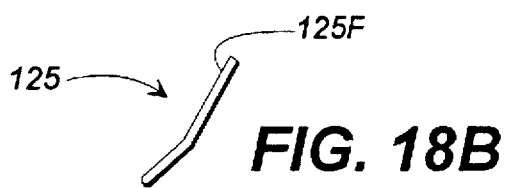

FIG. 18B is a partial view of the blade tip 124 as viewed along the fold line of the upturned foil portion 125F.

Figure 19A:
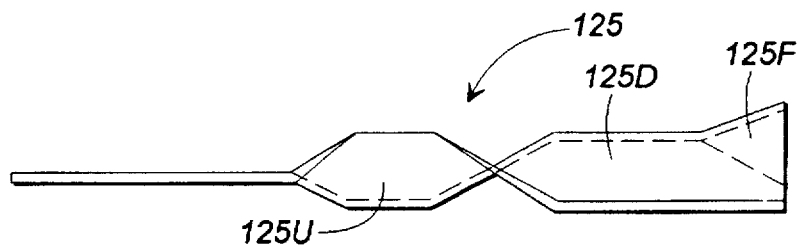

FIG. 19A is a leading edge plan view of the cutting blade tip 125 of FIG. 18.

Figure 19B:
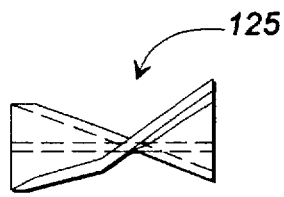

FIG. 19B is an end view of the blade tip of FIG. 19A.

Figure 20:
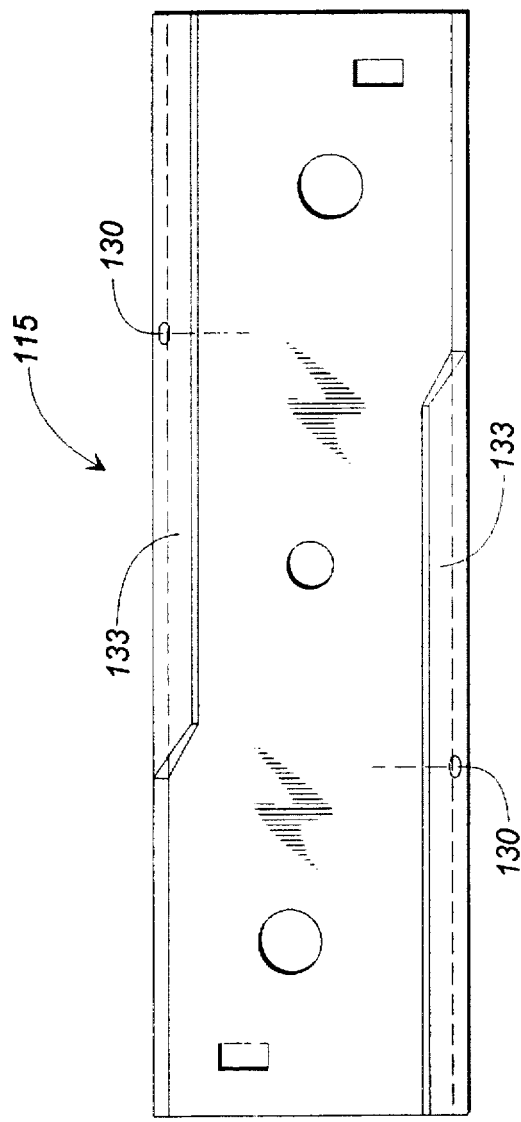

FIG. 20 is a top plan isolated view of a mounting bar 115 according to the present invention.

Figure 21:

FIG. 21 is an isolated side plan view of the mounting bar 115 of FIG. 20.

Figure 22:
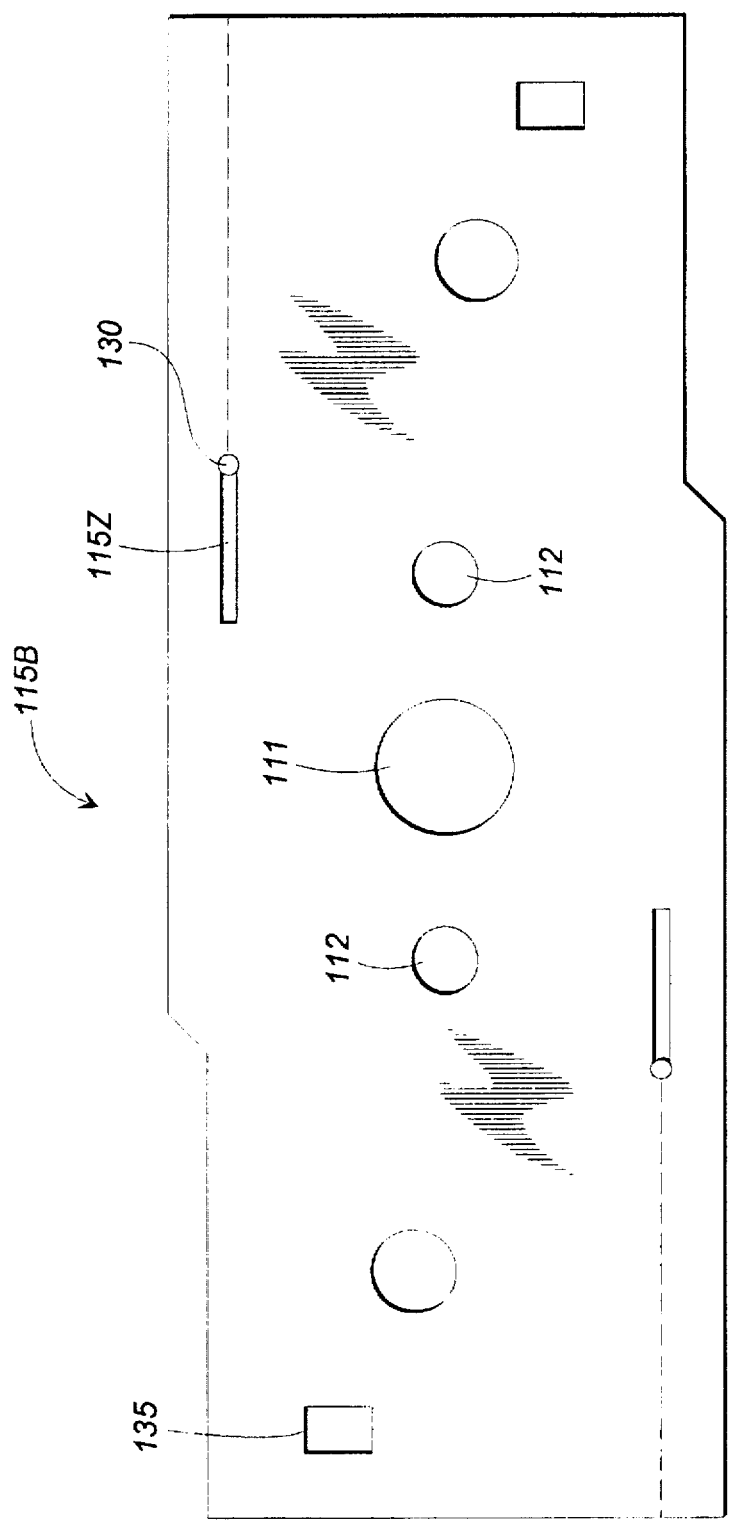

FIG. 22 is a top plan view of the mounting bar of FIGS. 20 and 21, in flat, "blank" form 115B.

Figure 23:
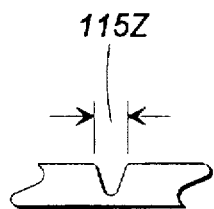

FIG. 23 is a detail view of an "inside" zipper according to the present invention.

Figure 24:
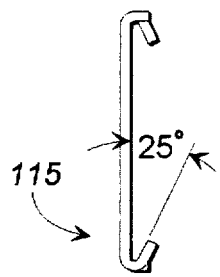

FIG. 24 is an isolated end plan view of the mounting bar 115 of FIG. 20.

Figure 25:
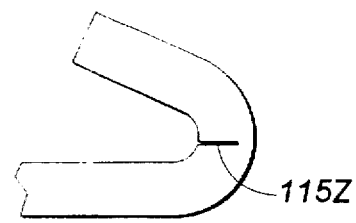

FIG. 25 is a close-up view of a portion of the mounting bar 115, with the zipper 115Z shown as closed or "hidden".

Figure 26:
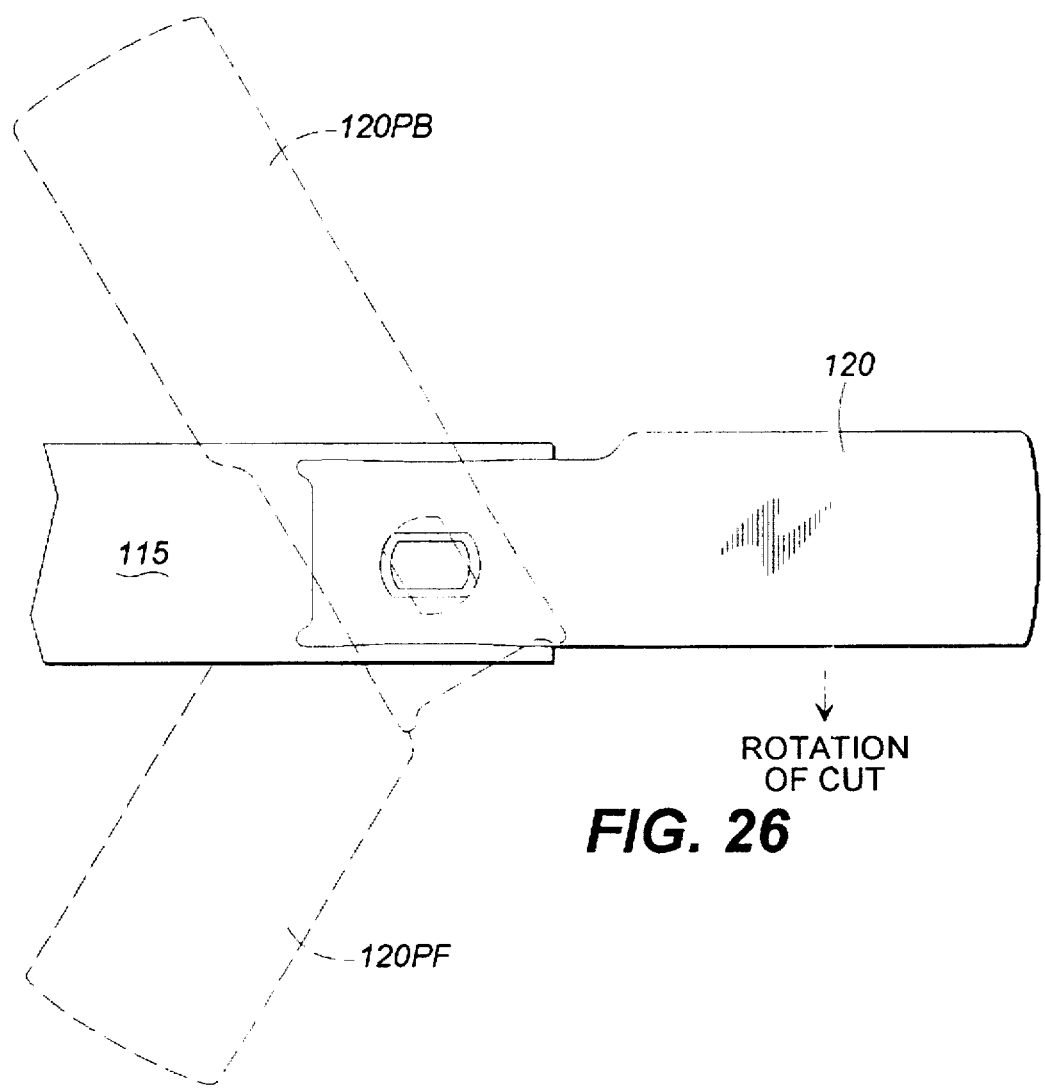

FIG. 26 is an illustrative view showing the "pivoting" provided between a cutting blade tip such as 120, in its "pivoted back" position shown as 120 PB, and its "pivoted forward" position 120 PF.

DETAILED DESCRIPTION OF THE PREFERRED EMBODIMENT

Reference is now generally made to the drawings, in which numerals designate like elements throughout the several views.

The "Family of Bars" Concept

Figure 1:
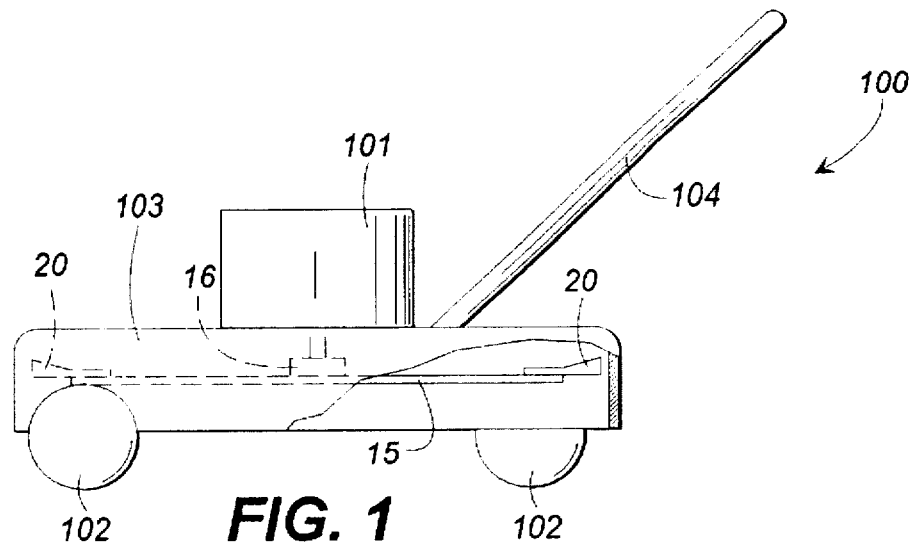
FIG. 1 is a left side, partially cut away view of a walk-behind lawn mower, illustrating the general concept according to the present invention of the use of detachable "blade tips" also according to the present invention.
Figure 2:
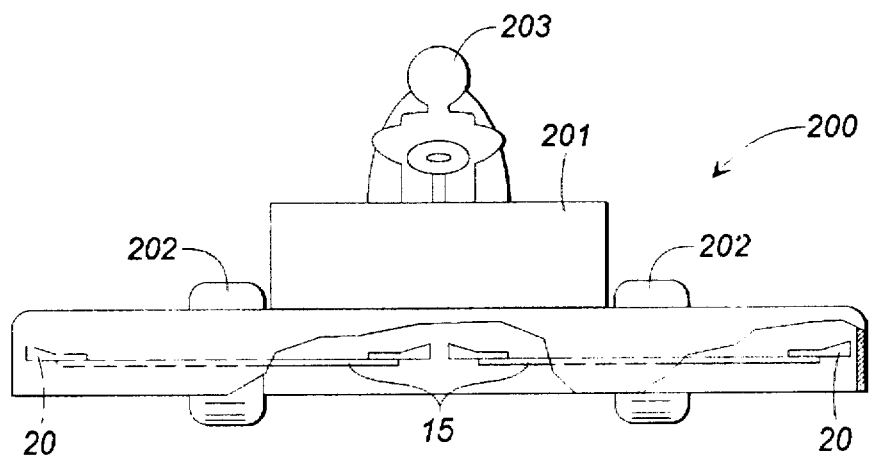
FIG. 2 is a front side, partially cut away view of a riding lawn mower, illustrating the concept of providing cutting blade tips which can fit not only the mower of FIG. 1, but also the riding mower of FIG. 2. The same or a different mounting bar may be used for the FIG. 1 or the FIG. 2 configurations.
Figure 3:
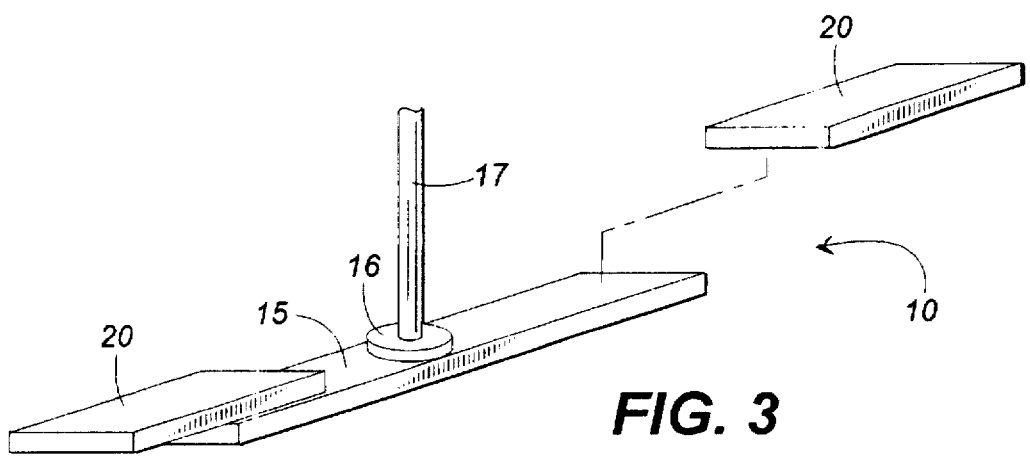
FIG. 3 is a general conceptual disclosure of the basic concept of the present invention of providing a mounting bar with detachable blade tips.

Reference is now made to FIGS. 1–3, which are general illustrative views relating to a concept according to the present invention, which is the capability of a single type of replaceable cutting blade tip 20 to be used on a wide variety or "family" of different mounting bars 15 in different mower configurations such as 100 and 200.

As may be understood, assuming the attachment configurations between the two are similar, a wide variety of mounting bars 15 may be used with a wide variety of replaceable cutting blade tips 20. For example, for a particular mounting bar 15 size (e.g., one which will fit the walk-behind mower such as 100 in FIG. 1), a wide variety of replaceable cutting blade tips 20 may be utilized, depending on whether the operator desires to mulch, discharge, or bag. Similarly, a particular replaceable cutting blade tip 20 having a particular function (e.g. a mulching blade tip) may be used on a wide variety of mounting bars (e.g., either the bar 15 fitting the mower 100 or the longer dual-bar mower 200 shown in FIG. 2), as under one embodiment of the invention, different mounting bars may be used on different mower and/or deck sizes.

It may be understood that examples of different cutting blade tip functions include conventional "side-discharge" (with or without bagging), "mulching" (no discharge), bagging, and any other functions known or developed in the future.

General Operation Of First Embodiment

The construction and operation of one embodiment of the present invention is now generally discussed, with general reference to FIGS. 4–11. One or more (typically two) replaceable cutting blade tips 20 (see FIG. 5) and a central mounting bar 15 (see FIG. 4) comprise a cutting blade assembly 10. Each of the replaceable cutting blade tips 20 can be selectively attached to the central mounting bar 15 without the use of tools. During typical operation, the replaceable cutting blade tips 20 fit snugly relative to the central mounting bar 15 and little, if any, relative pivoting therebetween is evident. However, some relative pivoting can occur when exceptional loads are encountered by the replaceable cutting blade tips such as when an obstacle such as a rock is encountered. In such an instance, a "zipper" 70 is provided which allows the blade tip to "tear" its way through the zipper while pivoting, thus advantageously providing a means for dissipating energy, while preferably remaining safely attached and preferably without allowing any part of the mounting bar to become detached.

Blade Assembly Construction

As noted above, a blade assembly 10 according to the present invention includes a pair of similar replaceable cutting blade tips 20 and a central mounting bar 15. The mounting bar 15 in the FIG. 4 configuration is substantially elongate, thus having a pair of opposing ends, hereinafter referred to as first and second ends 14 and 16, respectively, as shown in FIG. 4. As may be seen from the drawings, this bar (as well as the cutting tip 20) is substantially planar, due to its construction being of stamped metal plating, although other constructions are contemplated. This mounting bar 15 is substantially symmetrical about its rotational (vertical) axis, therefore description of one of the ends will suffice to describe both ends. As an example, end 14 will hereinafter be described in detail, and in conjunction with a discussion of a typical replaceable blade tip 20 as shown in FIG. 5.

Referring therefore now both to FIGS. 4 and 5, end 16 of the mounting bar 15 includes a headed pin member 17, and a blade tip-receiving channel section C. The headed pin member 17 extends from the upper side of the generally planar mounting bar 15. The replaceable blade tip 20 includes an inner section L, and defines a through hole 21 which passes through said inner section L. As shown in FIG. 6, when assembled the blade tip-receiving channel section C of the mounting bar 15 accepts the length of the inner section L of the removable cutting blade tip 20, while at the same time the headed pin member 17 passes through the close-fitting hole 21 and eventually engages one edge of that hole 21, thus preventing the movement of the blade tip 20 along its longitudinal axis.

As shown in relative detail in FIG. 7, under one embodiment of the present invention the shaft 17S of the headed pin member 17 is riveted into a hole in the platelike mounting bar 15. The headed pin member 17 is symmetrical, which assists manufacture and makes installation orientation irrelevant. The first shoulder 41 on the headed pin member 17 controls how far the riveted end of the headed pin member 17 enters the bar's hole. This controls how much clearance generally noted at "C" is provided under the headed pin member's head, where the blade tip is held. Some extra "under head" clearance is provided so that debris will not prevent the blade tip from moving under the head of the headed pin member 17. Sufficient centrifugal force is available during operation of the blade assembly to insure that the replaceable blade tips 20 slide outward against any debris interference to their proper operating position.

The cross section of the channel includes the floor portion 31 (See FIG. 8), bounded on its leading edge by a low leading wall 32 and bounded along its trailing edge by a bent-over trailing wall 33. The mounting bar's low leading wall 32 gives the operator better visibility and allows easier blade tip pivoting as discussed later. The mounting bar's bent over wall 33 captivates the blade tip, providing vertical retention and discouraging removal as discussed in more detail below.

Within the bent-over trailing wall is a zipper 70, which is a reduced-thickness elongate "tear zone" which provides a predictable and safe path for the bent-over trailing wall to tear during exceptional impacts as shown in FIG. 10. At the end of each zipper 70 is a zipper hole 71 which dissipates stresses and stops tearing, while encouraging a safe "hinge" to form during the tearing process.

The bar's headed pin member 17 and the blade tip's mounting hole 21 are offset laterally to prevent any blade tips from being accidentally installed upside down. As may later be understood, by providing the offset away from the bent over leg, blade tip removal and installation is better facilitated.

Installation and Removal

As noted above, installation of the replaceable blade tips 20 upon the mounting bar 15 may be accomplished without the use of any tools. Removal may in some instances require the use of a simple tool 50 as described below.

As shown in FIG. 8, during installation the blade tip must be rotated generally about its longitudinal axis and its "trailing" edge inserted under the folded over leg of the mounting bar as shown by the position shown in solid line. Typically the blade tip will be moved as shown by arrow "A" from the previous position shown in dotted line into the solid-line position during the installation process, although in some configurations it can also be introduced from the end to the solid-line initial orientation shown. The blade tip 20 is then moved in or out along the longitudinal axis of the mounting bar until its pivot hole 21 aligns over the bar's headed pin member. The blade tip 20 is then lowered and rotated as denoted by arrow "B", as the blade tip's hole 21 passes down over the head of the headed pin member 17.

Now the blade tip 20 can move out to its operating (cutting) position, where it is locked under the head of the headed pin member 17 and the bent over trailing wall of the mounting bar 15.

It may be understood that the mounting bar's low leading wall 31 gives the operator better visibility and allows for easier blade tip pivoting during exceptional impact. It may also be understood that the mounting hole 21 and headed pin member 17 are displaced laterally to prevent upside-down blade tip installation. The blade tip mounting hole 21 and the headed pin member 17 head diameter are sized to provide an easy, but small on/off clearance to discourage accidental removal.

Blade tip removal is the reverse of installation, in that the relevant blade tip 20 is removed by first sliding it relative to the mounting bar until the hole 21 is aligned with the headed pin member 17, and then pivoting the blade tip upwardly such that the hole 21 of the blade tip 20 is clear of the headed pin member 17.

Offdriver Blade Tip Removal

Reference is now made to FIGS. 9 and 11A–11D, which combine to illustrate a concept of the present invention relating to a blade tip removal.

As described above, under at least some embodiments of the present invention, the blade tips 20, when installed, have one edge of their holes 21 biased against a headed pin member 17 or other suitable member attached to the mounting bar 15. In order to remove a blade tip 20 from the mounting bar 15, as noted above it is first necessary to move the blade tip inwardly (substantially along its longitudinal axis), until its hole 21 is lined up properly with the headed pin member's head, so the blade tip can then be pivoted upwardly as described in detail above. Such inward movement of the blade tip 20 could be somewhat difficult if the blade tip has been used for a period of time such that grass clippings and other such debris has accumulated over a period of use. Such removal could also be difficult for a user who is unfamiliar with such items, which could be the case if such blade tips have not been recently removed, if ever removed, by a user.

In light of the above considerations, the present invention provides a pair of removal holes 35, 36, one in the blade tip 20 and one in the mounting bar 15. By manipulating a removal member (herein also at times referred to as an "offdriver") within said holes from below, it is possible for even an inexperienced user (such as a homeowner who only occasionally services his/her mowing unit) to quickly and easily remove a blade tip 20 from its associated mounting bar 15.

Reference is now made to FIG. 11A, which illustrates a blade tip 20 mounted atop a mounting bar 15, with an offdriver just beginning to be inserted into misaligned holes 36, 35, which extend through blade tip 20 and mounting bar 15, respectively. It may be understood that such "misalignment" is intentional and preferred during the operating or cutting operation.

Although the holes 35, 36 overlap as shown in FIG. 11A, there preferably is enough room to allow insertion of the offdriver 50 as shown in FIG. 11A. Under one embodiment of the invention, the offdriver 50 may be a conventional ¼" screwdriver, which as may be understood includes a pair of tapering faces 51 (see FIG. 9), which taper towards the standard "tip" of the screwdriver. As the offdriver is further manually urged upwardly to the position shown in FIG. 11B, the wedging effect caused by the tapering faces 51 causes the blade tip 20 to be moved inwardly relative to the mounting bar and towards its position shown in FIG. 11B, such that the hole is aligned with the head of the headed pin member.

The offdriver's function under the present invention is still not complete. Once the two members 15, 20, are in their relative positions shown in FIG. 11B, the offdriver may then be urged further along its longitudinal axis such that it pushes the blade tip 20 upwardly and generally away from the mounting bar 15, towards the position shown in FIGS. 11C and 11D, as the offdriver has a location along its length which will not pass through the hole in the blade tip 20, although such a location will pass through the hole in the mounting bar 15.

Therefore it may be understood that the offdriver provides a dual motion while only being pushed in a single direction, although it should be understood that some side to side prying action may be necessary in certain instances to initially break the two elements 15, 20, apart, especially after long periods of use.

It may therefore be understood that the above offdriver feature also gives the operator a visual indication from below when the blade tip is correctly positioned. This visual indication is available from below the blade assembly even though the operator cannot fully view the on/off operation.
Conventional Operation; Resistance to Inadvertent Removal During typical operation of the blade assembly 10, the replaceable blade tips 20 are designed such that they discourage accidental detachment, in part because the blade tip path during removal requires movements that are against and opposite to natural forces acting upon the blade tip, especially during operation.

For a blade tip to be removed during operation, it would first have to move inward against very high centrifugal forces to stop exactly where its mounting hole 21 aligns precisely with the head of the headed pin member 17. The overtravel available to the blade tip also makes this alignment unlikely. This overtravel feature also insures blade tip retention even when the mower is turned on its side during maintenance or blade tip exchange. Next the blade tip must move upward against gravity to clear the pin's head, and it must also rotate about its longitudinal axis, because its edge is trapped under the bar's bent-over trailing wall 33. The flat horizontal bar surface under the blade tip makes transferring such a rotating motion to the blade tip very difficult.

The cutting edge 23 of all blade tips is offset to insure the same height of cut for all blade tips used on each mower. This offset location for the cutting edge 23 is lower than all other parts of the blade tip and the bar to insure that the grass tips are not impacted by other surfaces which would consume additional power and also shatter the grass tips, turning them brown.
Damage Control This design can operate successfully in both normal mowing, "blade impact testing" and during exceptional situations where a solid object (such as a rock) is encountered by the blade tip. During normal mowing the blade tips 20 do not pivot much, if at all, about their associated headed pin member 17; instead the close fit between the two elements 15, 20 insures that the blade tips move with the bar to minimize the noise that would occur if there was relative motion, especially during engine starting and stopping.

To accommodate exceptional impacts such as those encountered during blade impact testing or if a rock or other solid object is encountered in the field, the blade tips are allowed to pivot and consequently deform themselves and/or the mounting bar in a manner which tends to spread the shock energy over a longer period of time, thus reducing the tendency of unacceptable "spikes" of force imported to the mounting bar, and consequently to the engine shaft. Such a "controlled deformation" design also allows the blade tip to be harder for longer wear. The low leading wall 32 is high enough to contact the blade during normal mowing, but in one configuration is low enough relevant to the blade to allow the blade to rise above and to pivot over it during exceptional impact, although some bending or other deformation may occur to the blade tip corner which "rides" over the leading wall. The bar's higher wall 33 provides strength to the bar, but as noted above has a reduction in thickness called a "zipper" 70, which provides a predictable and safe path for the wall to be torn by the cutting blade tip after it encounters an object such as an ANSI safety standard testing stake 1000 such as shown in FIG. 10. A hole 71 is added at the inner end of the zipper to dissipate and to stop the tearing stresses. This area of leg above the hole is encouraged to become the hinge about which the torn leg pivots, while remaining safely attached to the bar as shown in FIG. 10.
Interchangeability As noted above, the "under head" clearance is designed with debris allowance, to fit nominal blade tip thickness. Blade tips made from stock that is thicker or thinner than the nominal blade tip may be formed to fit in critical areas. This insures a proper fit for all blade tips.
Special Manufacturing Considerations As is typically the case, cost-efficiency in manufacturing techniques usually translates to a lower cost manufactured product. The present invention includes such cost-efficient manufacturing techniques, such as the use of a symmetrical headed pin member 17, which makes blade tip mounting rivet installation orientation unimportant, as well as the use of a pin shoulder 41, which automatically and accurately sets the blade tip clearance under the head of the headed pin member 17.
Alternatives Alternative mounting configurations for mounting the blade tip to the mounting bar are contemplated under the present invention. For example, instead of the above-referenced configuration, a hole could be placed in the mounting bar, which would accept a headed pin member mounted on the blade tips. The folded-over leg could be on the blade tip instead of the mounting bar. The vertical leg could be on the blade tip instead of the mounting bar, along with or instead of the folded-over leg.

Furthermore, one, two, three, four, or more separate blade tips could be used on a single mounting bar, which would have to have a suitable corresponding number of mounting locations (e.g. headed pin members). Instead of a cutting blade tip, a "dummy" (non-cutting) tip could be used for balancing, if necessary. Additional holes could also be used along the zipper instead of just one at the end.
Dimensions Although other dimensions may be used, the following are some dimensions preferred at the time of filing this application:

Blade tip hole 21 1 inch plus/minus 0.25"

Bar ledge 33 angle 25 degrees plus/minus 10 degrees

Blade tip 20 width 2.25 inches plus/minus 0.25"

Blade tip hole inner edge to 7½ inches plus/minus 0.50" blade tip outer edge

Blade tip hole offset 0.188 inches plus/minus 0.12"

Blade tip hole to offdriver hole 1 inch (plus/minus 0.12") by 0.433 (plus/minus 0.12")

Reference is now made to FIGS. 12–25, which illustrate an alternate embodiment according to the present invention, which includes additional advantages, including advantages regarding the resistance to detachment of the blade tips during stationary object impact, the resistance to detachment of a portion of the blade mounting bar during the zipping operation, and the resistance to detachment of the mounting bar from its associated shaft hub.

Bar/Tip Interlocking; the "Double-D" Concept

In the embodiment of the invention shown in Figs. embodiment of the invention shown in FIGS. 12–26, a "Double-D" configuration associated with the blade mounting bar 115 and the blade tips (120, 125) provides an advantageous locking feature during significant blade impact with a stationary object.

In this embodiment, the headed pin member 117, and the blade tip mounting hole 121 in each of the tips 120, 125 all have "Double D" configurations, as shown in FIGS. 12–15 and 18A. During installation and during normal operation, the "Double D" configuration has no different effect because the planar faces 117F of the "Double D" headed pin member 117 are installed parallel to the longitudinal axis of the elongate mounting bar.

However, behavior of the elements shown in FIGS. 12–26 is different when the blade assembly contacts a stationary object, such as during blade impact tests or when a rock or other ground-associated object is struck during use. As may be understood, the blade tips are designed to rotate upon catastrophic impact, as discussed with respect to the previously-discussed embodiments. However, the "Double D" shape of the headed pin member 117 and the associated blade tips (120 or 125) discourages blade tip detachment during this rotation because the combination is "locked" together as soon as relative rotation occurs.

Reference is now also made to FIG. 26. Upon contact with a stationary object, the blade tip (such as 120 in FIG. 15) will tend to rotate about the headed pin member 117 toward a "pivoted back" position 120 PB, as it tears the bent-over trailing wall as discussed earlier. At this point, it may be understood that the blade tip is effectively "locked" onto the headed pin member 117 (which is attached to the mounting bar 115), due to the misalignment their matched "Double D" irregular shapes.

As the blade pivots relative to the headed pin member 177 of the mounting bar 115 upon impact, it tears the trailing channel leg until the incident angle approaches approximately 90°, where as discussed in further detail below an alternate "inboard" zipper 115Z is located (from the stress dissipation hole 130 (see FIG. 22) inward about 1 inch) to facilitate leg tearing but at the same time to discourage the leg from breaking off. When the cutting blade tip is pivoting in such a rearward direction towards its extreme "pivoted-back" position 120 PB, it may be understood that part of it is "riding" atop the leading edge of the mounting bar 115, much as it did as discussed earlier.

It may also be understood that, after one of the cutting blade tips contacts a stationary member, the initially-contacted blade tip will tend to move out of the way, allowing the overall assembly to continuing rotating. In such a situation, the opposite cutting blade tip may also contact the stationary member. When this occurs, it may be understood that the second-in-time cutting blade tip will contact the stationary object, and in many cases the entire assembly will then be stopped. When this happens, it has been found that the first-contacted cutting blade tip will tend to "rebound" from its pivoted-back position, resulting in movement back to its original position, and continuing to move into a "pivoted-forward" position indicated as 120PF in FIG. 26, which is in some cases more than 180 degrees from the extreme "pivoted-back" position 120 PB. In such a situation, the mounting blade again "rides" on top of the leading edge of the mounting bar 115, much as it did as discussed earlier, thus dissipating energy.

Although the "Double D" shapes associated with the mounting bar and blade tips may tend to align for a very short period of time during this "rebound" step, it has been found that this alignment does not tend to result in ejection of the blade tip, due to the very high speeds involved, and due to the existence of centrifugal forces which tend to cause the blade tip to remain under the inside lip of the pin.

The Inboard Zipper

In the embodiment shown in FIGS. 20–25, a different, "inboard", type of zipper is used. As in this embodiment, thinner material is used (0.105"), a zipper to allow initial tearing to the stress relief hole 130 is not as important. However, once the tear has been made to the hole 130, a new zipper 115Z comes into play, to reduce the chance of detachment of the "tab" formed by tearing. As shown for example in FIG. 22, the zipper 115Z is "inboard" (it does not extend to an edge of the blade) and is also on the upper surface of the mounting bar 115, and disappears when the fold is made. In one embodiment, the zipper 115Z is 0.080" deep.

As noted above, when the blade tips pivot back upon significant impact, they tear through the bent-over trailing wall. As their angle increases, it may be understood that the trailing edge of the cutting blade tip will eventually effectively push in a direction parallel to the channel formed by the bent-over trailing wall. In such a situation, the channel will tend to have "column" strength, and tearing can become unpredictable, and in certain situations could result in disadvantageous separation of a portion of the bent-over trailing wall. Therefore, it has been found advantageous to provide an "inboard" zipper 115Z, which is effectively "hidden", upon folding of the blade, as shown best by a comparison of FIG. 23 (open) and FIG. 25 (closed). It may be understood that this "inboard" zipper 115Z provides a more predictable tear path, and discourages separation of the tab of the mounting bar 115.

In the embodiment shown in FIGS. 12–25, only the "inboard" zipper 115Z is used. However, one zipper does not significantly effect the operation of the other, and it may be understood that both zippers may be used, as indicated by FIG. 22.

The Modified Mounting Bar Shape

It may be understood that a 1¾ inch square hub could be used for attachment to the shaft coming from an engine. Referring now also to FIGS. 20 and 24, it may be seen that the bent over legs 133 are longer than in the previously-discussed design and extend adjacent to the hub mounting location, to where they provide rotational support to the center hub. This good lateral fit discourages hub rotation relative to the bar during operation, which could loosen the attachment therebetween.

The Forming Process

It should be understood that there can be many different processes used in forming the mounting bar/blade tip combinations described above, according to known forming processes in the art. However, it may be understood that one way of forming the bar is by the use of a mandrel member (not shown) which is placed under the blank and used as a forming member while rollers push the heated blank into the forms shown. It may be understood that a retractable mandrel may be used to allow it to slide out from within the formed mounting bars repeatedly without undue wear. Heat treatment as known in the art is done after hot forming of the blade.

CONCLUSION

While this invention has been described in specific detail with reference to the disclosed embodiments, it will be understood that many variations and modifications may be effected within the spirit and scope of the invention as described in the appended claims.

What is claimed is:

1. A cutting blade assembly, comprising:
    a mounting bar having an elongate end portion itself comprising an elongate channel having a longitudinal axis substantially parallel to that of said elongate end portion of said mounting bar and a pin, said pin having a head and a shaft; and
    a removable blade tip for attachment relative to said end portion of said mounting bar, said blade tip having an inner sectional portion defining a through hole suitably sized to allow said pin to pass therethrough during attachment of said blade tip to said mounting bar, said blade tip inner sectional portion having a transverse cross section configured to fit within said mounting bar channel to allow for sliding of said inner sectional portion of said blade tip in an outward direction along said channel after said blade tip hole has passed over said pin head, such that said pin shaft engages an edge of said blade tip hole and prevents further movement of said blade tip relative to said mounting bar during rotation of said cutting blade assembly.

2. The cutting blade assembly as claimed in claim 1, wherein said pin head is configured such that movement of said cutting blade tip in an inward direction causes said hole to first align and then to overtravel and misalign with said pin head to prevent removal of said blade tip due to said overtravel.

3. The cutting blade assembly as claimed in claim 1, wherein said channel of said mounting bar includes an overhanging leg portion configured to provide vertical blade tip stability.

4. The cutting blade assembly as claimed in claim 3, wherein said overhanging leg is a trailing leg, and wherein said channel further comprises a lower, leading leg configured to discourage rotation of said blade tip about said pin.

5. The cutting blade assembly as claimed in claim 3, wherein said channel further comprises a leg separate from said overhanging leg configured to discourage rotation of said blade tip about said pin and to provide improved visibility during blade tip installation and removal.

6. The cutting blade assembly as claimed in claim 1, wherein said channel includes a tearable portion which purposefully tears upon contact of said blade tip with a relatively immovable stationary object during rotation.

7. The cutting blade assembly as claimed in claim 6, wherein said tearable portion of said channel includes a zipper of reduced thickness along which said tearing preferably occurs.

8. The cutting blade assembly as claimed in claim 7, wherein said zipper terminates in a stress-dissipating through hole.

9. The cutting blade assembly as claimed in claim 1, wherein said mounting bar and said blade tip each include a blade tip removal through hole configured to substantially align when said blade tip is in position to be removed relative to said mounting bar.

10. The cutting blade assembly as claimed in claim 1, wherein said blade tip removal through holes of said mounting bar and said blade tip are configured to facilitate the introduction of a blade tip removal member from below and wherein said through hole of said blade tip is smaller than said hole of said mounting bar, such that said blade tip removal member can facilitate alignment of said holes and subsequent upward pivoting and removal of said blade tip due to the relatively smaller size of said hole in said blade tip.

11. The cutting blade assembly as claimed in claim 1, wherein said bar and said blade tip are configured such that their separation is against centrifugal and gravitational forces imparted on the blade tip during rotation of said cutting blade assembly.

12. A cutting blade assembly, comprising:
    a mounting bar with a pin and a channel having a tearable portion; and
    a removable blade tip with a inner sectional portion to slidably fit in said channel and also having a hole to fit about the longitudinal axis of said pin, said blade tip and said bar configured to allow pivoting of said blade tip about said pin, and also to allow for simultaneous tearing of said tearable portion, said tearable portion being configured to tend to tear within a predictable region upon unexpected contact of said blade tip with a relatively stationary object during rotation, while tending to remain attached relative to said mounting bar by said pivoting about said pin.

13. The cutting blade assembly as claimed in claim 12, wherein said tearable portion of said channel includes a zipper of reduced thickness along which said predictable tearing occurs.

14. The cutting blade assembly as claimed in claim 13, wherein said zipper terminates in a stress-dissipating through hole.

15. The cutting blade assembly as claimed in claim 12, wherein said mounting bar and said blade tip each include a through hole configured to substantially align when said blade tip is in position to be removed relative to said mounting bar.

16. The cutting blade assembly as claimed in claim 15, wherein said through holes of said mounting bar and said blade tip are configured to facilitate the introduction of a blade tip removal member from below and wherein said through hole of said blade tip is smaller than said hole of said mounting bar, such that said blade tip removal member can facilitate alignment of said holes and subsequent upward pivoting and removal of said blade tip due to the relatively smaller size of said hole in said blade tip.

17. The cutting blade assembly as claimed in claim 14, wherein said bar and said blade tip are configured such that their separation is against centrifugal and gravitational forces imparted on the blade tip during rotation of said cutting blade assembly.

18. A replaceable cutting blade tip configured for use within a cutting blade assembly itself including a mounting bar having an elongate end portion itself having an elongate channel having a longitudinal axis substantially parallel to that of said elongate end portion of said mounting bar, said replaceable cutting blade tip configured for attachment relative to at least one end of said mounting bar, said replaceable blade tip itself comprising:
    an inner sectional portion defining a through hole suitably sized to allow said pin to pass therethrough during attachment of said blade tip to said mounting bar, said inner sectional portion having a transverse cross section configured to fit within said channel of said mounting bar to allow for sliding of said inner sectional portion of said blade tip in an outward direction along said channel after said pin has passed said pin head, such that said pin shaft engages an edge of said blade tip hole and prevents further movement of said blade tip relative to said mounting bar during rotation of said cutting blade assembly.

19. The cutting blade assembly as claimed in claim 18, wherein said mounting bar and said blade tip each include a through hole configured to substantially align when said blade tip is in position to be removed relative to said mounting bar.

20. The cutting blade assembly as claimed in claim 19, wherein said through holes of said mounting bar and said blade tip are configured to facilitate the introduction of a blade tip removal member from below and wherein said through hole of said blade tip is smaller than said hole of said mounting bar, such that said blade tip removal member can facilitate alignment of said holes and subsequent upward pivoting and removal of said blade tip due to the relatively smaller size of said hole in said blade tip.

21. The cutting blade assembly as claimed in claim 18, wherein said bar and said blade tip are configured such that their separation is against centrifugal and gravitational forces imparted on the blade tip during rotation of said cutting blade assembly.

22. The blade tip as claimed in claim 18, wherein said hole has a diameter of one inch plus or minus ¼ inches.

23. The blade tip as claimed in claim 18, wherein the width of the blade tip inner sectional portion is 2.25 inches plus/minus ¼ inches.

24. The blade tip as claimed in claim 18, wherein the distance between the inner edge of said hole and the outside edge of said tip is seven and one-half (7½) inches plus/minus ½ inch.

25. The bladetip as claimed in claim 18, wherein said hole center is offset aling the widthe of said inner sectional portion.

26. A replaceable cutting blade tip configured for use within a cutting blade assembly itself including a mounting bar having an elongate end portion itself having an elongate channel having a longitudinal axis substantially parallel to that of said elongate end portion of said mounting bar, said replaceable cutting blade tip configured for attachment relative to at least one of at least two outside ends of said mounting bar, said replaceable blade tip itself comprising:

an inner sectional portion defining a through hole suitably sized to allow said pin to pass therethrough during attachment of said blade tip to said mounting bar, said inner sectional portion configured to slidably contact said channel of said mounting bar to allow for sliding of said inner sectional portion of said blade tip in an outward direction along said channel after said pin has passed said pin head, such that said pin shaft engages an edge of said blade tip hole and prevents further movement of said blade tip relative to said mounting bar during rotation of said cutting blade assembly.

27. The cutting blade assembly as claimed in claim 26, wherein said mounting bar and said blade tip each include a through hole configured to substantially align when said blade tip is in position to be removed relative to said mounting bar.

28. The cutting blade assembly as claimed in claim 27, wherein said through holes of said mounting bar and said blade tip are configured to facilitate the introduction of a blade tip removal member from below and wherein said through hole of said blade tip is smaller than said hole of said mounting bar, such that said blade tip removal member can facilitate alignment of said holes and subsequent upward pivoting and removal of said blade tip due to the relatively smaller size of said hole in said blade tip.

29. The cutting blade assembly as claimed in claim 26, wherein said bar and said blade tip are configured such that their separation is against centrifugal and gravitational forces imparted on the blade tip during rotation of said cutting blade assembly.

30. A mounting bar configured for use with a replaceable cutting blade tip having a hole adjacent its inner end, said mounting bar itself comprising:

a first end;

a second end having an elongate end portion itself having an elongate channel having a longitudinal axis substantially parallel to that of said elongate end portion of said mounting bar and said elongate end portion also having a mounting pin, said mounting pin configured to pass through said hole in said cutting blade tip during attachment of said replaceable cutting blade tip to said mounting bar, and said channel of said mounting bar configured to accept said inner sectional portion of said replaceable cutting blade tip to allow for sliding of said inner sectional portion of said blade tip in an outward direction along said channel after said pin has passed said pin head, such that said pin shaft engages an edge of said blade tip hole and prevents further movement of said blade tip relative to said mounting bar during rotation of said cutting blade assembly.

31. The cutting blade assembly as claimed in claim 30, wherein said mounting bar and said blade tip each include a through hole configured to substantially align when said blade tip is in position to be removed relative to said mounting bar.

32. The cutting blade assembly as claimed in claim 31, wherein said through holes of said mounting bar and said blade tip are configured to facilitate the introduction of a blade tip removal member from below and wherein said through hole of said blade tip is smaller than said hole of said mounting bar, such that said blade tip removal member can facilitate alignment of said holes and subsequent upward pivoting and removal of said blade tip due to the relatively smaller size of said hole in said blade tip.

33. The cutting blade assembly as claimed in claim 30, wherein said bar and said blade tip are configured such that their separation is against centrifugal and gravitational forces imparted on the blade tip during rotation of said cutting blade assembly.

34. A method of attaching a replaceable lawn mower cutting blade tip relative to an elongate lawn mower cutting blade tip mounting bar to form a cutting blade assembly, said blade tip having an inner sectional portion defining a through hole and said mounting bar defining a channel having a longitudinal axis substantially parallel to that of said elongate mounting bar and including a pin, said pin having a head and a shaft, said method comprising the steps of:

placing said blade tip inner sectional portion at least partially within said channel such that said hole passes over said pin head; and sliding said length outwardly along said channel such that said pin shaft engages an edge of said blade tip hole and prevents further movement of said blade tip relative to said mounting bar during rotation of said cutting blade assembly.

35. A method of detaching a replaceable lawn mower cutting blade tip relative to an elongate lawn mower cutting blade tip mounting bar to separate a cutting blade assembly, said blade tip having an inner sectional portion defining a through hole and said mounting bar defining a channel having a longitudinal axis substantially parallel to that of said elongate mounting bar and including a pin, said pin having a head and a shaft, said method comprising the steps of:

sliding said blade tip inner sectional portion inwardly along said channel such that said blade tip hole substantially aligns with said pin head and does not overtravel; and pivoting said blade tip upwardly relative to said mounting bar such that said hole of said blade tip, clears said pin of said mounting bar; and removing said blade tip relative to said mounting bar.

36. A cutting blade assembly, comprising:

a mounting bar rotatable about a longitudinally vertical axis of rotation; and a removable cutting blade tip for attachment relative to said mounting bar, said cutting blade having a leading cutting edge being substantially horizontal and perpendicular to said axis of rotation, said mounting bar and said removable cutting blade tip detachably configured such that said removable cutting blade tip to be removed from said mounting bar must be moved first along a path substantially parallel to said cutting edge, and subsequently pivoted about an axis substantially parallel to said cutting edge, such that a hole defined by one of said bar and blade tip clears a pin extending from the other of said bar and blade tip.

37. The cutting blade assembly as claimed in claim 36, wherein one of said said mounting bar and said removable cutting blade tip includes a channel and the other of said mounting bar and said removeable cutting blade tip includes an edge, said edge configured to slide within said channel when said removable cutting blade tip is being moved along said path portion being substantially parallel to said cutting edge, and said edge lying substantially along said pivot axis during said subsequent pivoting of said removable cutting blade tip.

* * * * *